US012706545B2

(12) United States Patent
Sugimoto et al.

(10) Patent No.: US 12,706,545 B2
(45) Date of Patent: Aug. 11, 2026

(54) DUAL-FREQUENCY POWER-SUPPLY APPARATUS, HIGH-FREQUENCY HEATING APPARATUS, AND HIGH-FREQUENCY QUENCHING APPARATUS

(71) Applicant: Neturen Co., Ltd., Tokyo (JP)

(72) Inventors: Masato Sugimoto, Tokyo (JP); Hirotaka Tanaka, Tokyo (JP); Yohei Masuda, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 807 days.

(21) Appl. No.: 18/126,711

(22) Filed: Mar. 27, 2023

(65) Prior Publication Data

US 2023/0318478 A1 Oct. 5, 2023

(30) Foreign Application Priority Data

Mar. 29, 2022 (JP) ................................ 2022-053664

(51) Int. Cl.
*H02M 7/00* (2006.01)
*C21D 1/42* (2006.01)
(Continued)

(52) U.S. Cl.
CPC ............. *H02M 7/003* (2013.01); *C21D 1/42* (2013.01); *C21D 1/62* (2013.01); *C21D 11/00* (2013.01);
(Continued)

(58) Field of Classification Search
CPC .... H05B 6/101; H02M 7/003; H02M 7/5387; H02M 7/539
See application file for complete search history.

(56) References Cited

U.S. PATENT DOCUMENTS

2007/0047612 A1* 3/2007 Keough ................ H05B 6/067 373/52
2017/0348798 A1* 12/2017 Watanabe ........... B23K 11/043
(Continued)

FOREIGN PATENT DOCUMENTS

JP S6332847 B2 * 7/1988
JP 2001081513 A * 3/2001
(Continued)

*Primary Examiner* — Thomas E Lazo
(74) *Attorney, Agent, or Firm* — RANKIN, HILL & CLARK LLP

(57) ABSTRACT

Provided are a dual-frequency power-supply apparatus, a high-frequency heating apparatus, and a high-frequency quenching apparatus having a high durability.

A dual-frequency power-supply apparatus 1 includes a power supply 10 that alternately outputs a low-frequency current and a high-frequency current. The power supply 10 has an inverter 30 that converts a direct current into the low-frequency current and the high-frequency current and a controller 40 that controls the inverter 30. The controller 40 repeats, in this order, a first output period T11 in which the low-frequency current is output, a first intermission T12 in which output is stopped, a second output period T13 in which the high-frequency current is output, and a second intermission T14 in which output is stopped. The controller 40 sets the length of the first intermission T12 longer than a time Ta until the polarity of the output voltage of the power supply 10 is reversed fourthly after transition from the first output period T11 to the first intermission T12.

8 Claims, 8 Drawing Sheets

(51) Int. Cl.

| | |
|---|---|
| ***C21D 1/62*** | (2006.01) |
| ***C21D 11/00*** | (2006.01) |
| ***H02M 7/537*** | (2006.01) |
| ***H05B 6/04*** | (2006.01) |
| ***H05B 6/06*** | (2006.01) |
| *C21D 9/32* | (2006.01) |

(52) U.S. Cl.
CPC .............. *H02M 7/537* (2013.01); *H05B 6/04* (2013.01); *H05B 6/06* (2013.01); *C21D 9/32* (2013.01)

(56) References Cited

U.S. PATENT DOCUMENTS

2021/0368589 A1* 11/2021 Ono ....................... H05B 6/101
2023/0299693 A1* 9/2023 Junghänel ............. H02M 7/539 318/503

FOREIGN PATENT DOCUMENTS

JP 2002047515 A * 2/2002
JP 2007215256 A * 8/2007
JP 2008179847 A * 8/2008
JP 2009506743 A * 2/2009 ........ H02M 7/53878
JP 4427417 B2 * 3/2010
JP 2015216081 A * 12/2015
JP 6330102 B1 * 5/2018 ............... H02H 3/38

* cited by examiner

DUAL-FREQUENCY POWER-SUPPLY APPARATUS, HIGH-FREQUENCY HEATING APPARATUS, AND HIGH-FREQUENCY QUENCHING APPARATUS

BACKGROUND

Technical Field

An embodiment of the present invention relates to a dual-frequency power-supply apparatus, a high-frequency heating apparatus, and a high-frequency quenching apparatus.

Related Art

A technique of quenching a steel member to harden a surface thereof has been known. In quenching, a step of heating the steel member and a step of rapidly cooling the heated steel member are sequentially performed. As a method for effectively heating a surface of a member in a complicated shape, such as a gear, a high-frequency quenching process using high-frequency waves with two types of frequencies has been known (see Japanese Patent No. 4427417).

For a dual-frequency power-supply apparatus used for such a high-frequency quenching process, durability improvement has been demanded.

SUMMARY

An object of the embodiment of the present invention is to provide a dual-frequency power-supply apparatus, a high-frequency heating apparatus, and a high-frequency quenching apparatus having a high durability.

The dual-frequency power-supply apparatus according to the embodiment of the present invention includes a power supply that alternately outputs a first alternating current with a first frequency and a second alternating current with a second frequency higher than the first frequency, a first matching box that has a first matching transformer and is capable of receiving the output current of the power supply to output the first alternating current, and a second matching box that has a second matching transformer and is capable of receiving the output current of the power supply to output the second alternating current. The power supply has an inverter that converts a direct current into the first alternating current and the second alternating current, and a controller that controls the inverter. The controller repeats, in this order, a first output period in which the first alternating current is output, a first intermission in which output is stopped, a second output period in which the second alternating current is output, and a second intermission in which output is stopped. The controller sets the length of the first intermission longer than a time until the polarity of the output voltage of the power supply is reversed fourthly after transition from the first output period to the first intermission.

The high-frequency heating apparatus according to the embodiment of the present invention includes the above-described dual-frequency power-supply apparatus and a coil that receives the first alternating current and the second alternating current from the dual-frequency power-supply apparatus.

The high-frequency quenching apparatus according to the embodiment of the present invention includes the above-described high-frequency heating apparatus and a cooling apparatus that cools a workpiece heated by the high-frequency heating apparatus.

According to the embodiment of the present invention, the dual-frequency power-supply apparatus, the high-frequency heating apparatus, and the high-frequency quenching apparatus having a high durability can be provided.

DETAILED DESCRIPTION

Embodiment

Hereinafter, an embodiment of the present invention will be described with reference to the drawings.

Figure 1:
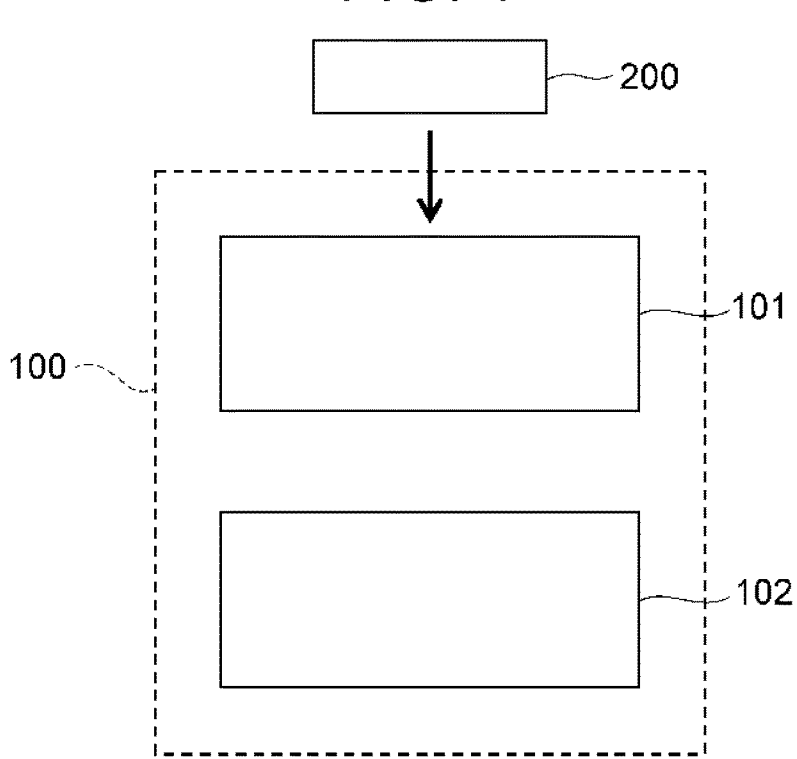
FIG. 1 is a block diagram showing a high-frequency quenching apparatus according to an embodiment.

FIG. 1 is a block diagram showing a high-frequency quenching apparatus according to the present embodiment.

As shown in FIG. 1, the high-frequency quenching apparatus 100 according to the present embodiment is provided with a high-frequency heating apparatus 101 and a cooling apparatus 102. The high-frequency heating apparatus 101 performs induction heating on a workpiece 200. The workpiece 200 is a member made of steel, and for example, is a member in a complicated shape, such as a gear. The high-frequency heating apparatus 101 heats a quenching target portion, e.g., part of a surface, of the workpiece 200 to a temperature higher than an austenite transformation point. The cooling apparatus 102 is, for example, a water cooling apparatus, and rapidly cools the workpiece 200 heated by the high-frequency heating apparatus 101.

Figure 2:
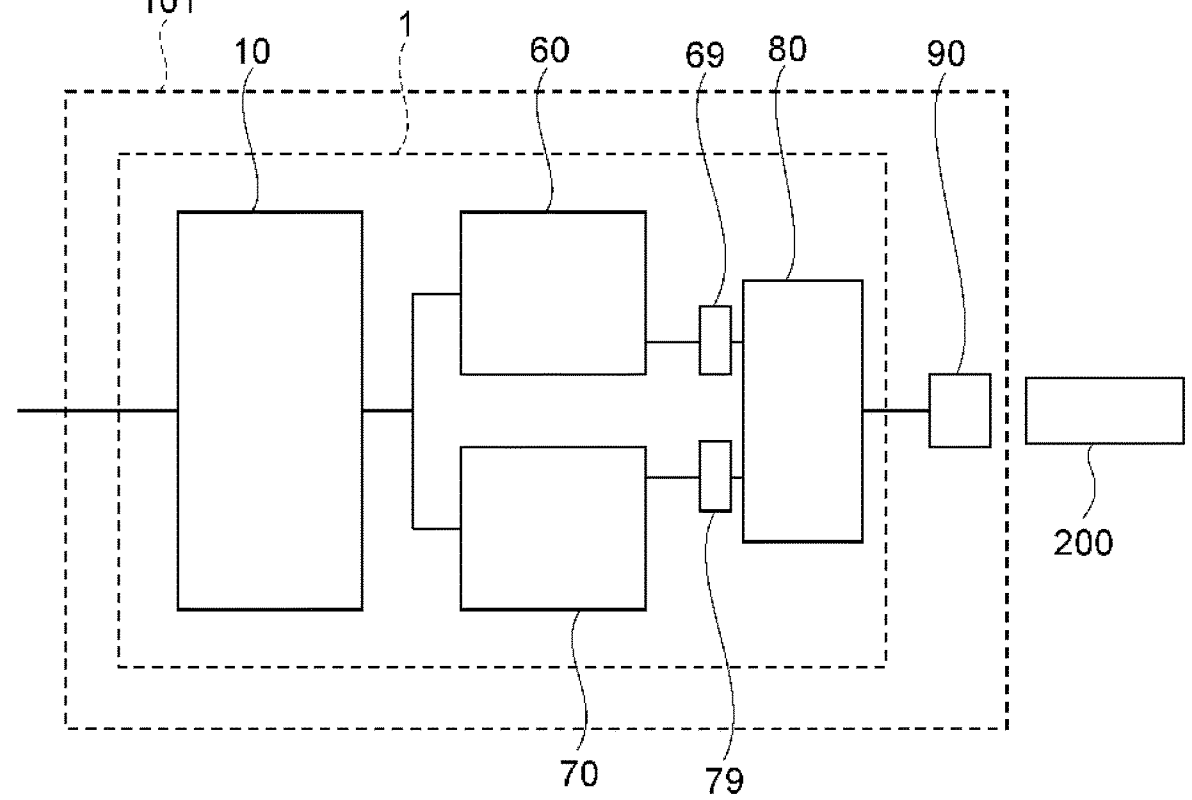
FIG. 2 is a block diagram showing a high-frequency heating apparatus according to the embodiment.

FIG. 2 is a block diagram showing the high-frequency heating apparatus according to the present embodiment.

As shown in FIG. 2, the high-frequency heating apparatus 101 according to the present embodiment is provided with a dual-frequency power-supply apparatus 1 and a coil 90. The coil 90 is arranged in the vicinity of the workpiece 200, and is supplied with an alternating current from the dual-frequency power-supply apparatus 1. With this configuration, the coil 90 performs induction heating on the workpiece 200.

The dual-frequency power-supply apparatus 1 is provided with a power supply 10, a first matching box 60, a second matching box 70, and a transformer 80. The power supply 10 alternately outputs a low-frequency current (first alternating current) with a first frequency and a high-frequency current (second alternating current) with a second frequency higher than the first frequency. As one example, the first frequency is 3 kHz, and the second frequency is 80 kHz.

The first matching box 60 and the second matching box 70 are connected to an output terminal of the power supply 10. The first matching box 60 matches the low-frequency current, and allows the low-frequency current output from the power supply 10 to pass through the first matching box 60. The second matching box 70 matches the high-frequency current, and allows the high-frequency current output from the power supply 10 to pass through the second matching box 70. A matching capacitor 69 for resonance is provided between the first matching box 60 and the transformer 80 such that resonance is made with the frequency (first frequency) of the low-frequency current. A matching capacitor 79 for resonance is also provided between the second matching box 70 and the transformer 80 such that resonance is made with the frequency (second frequency) of the high-frequency current. The transformer 80 receives the output current of the first matching box 60 and the output current of the second matching box 70, and converts the received current and the voltage thereof to output the converted current to the coil 90.

Figure 3:
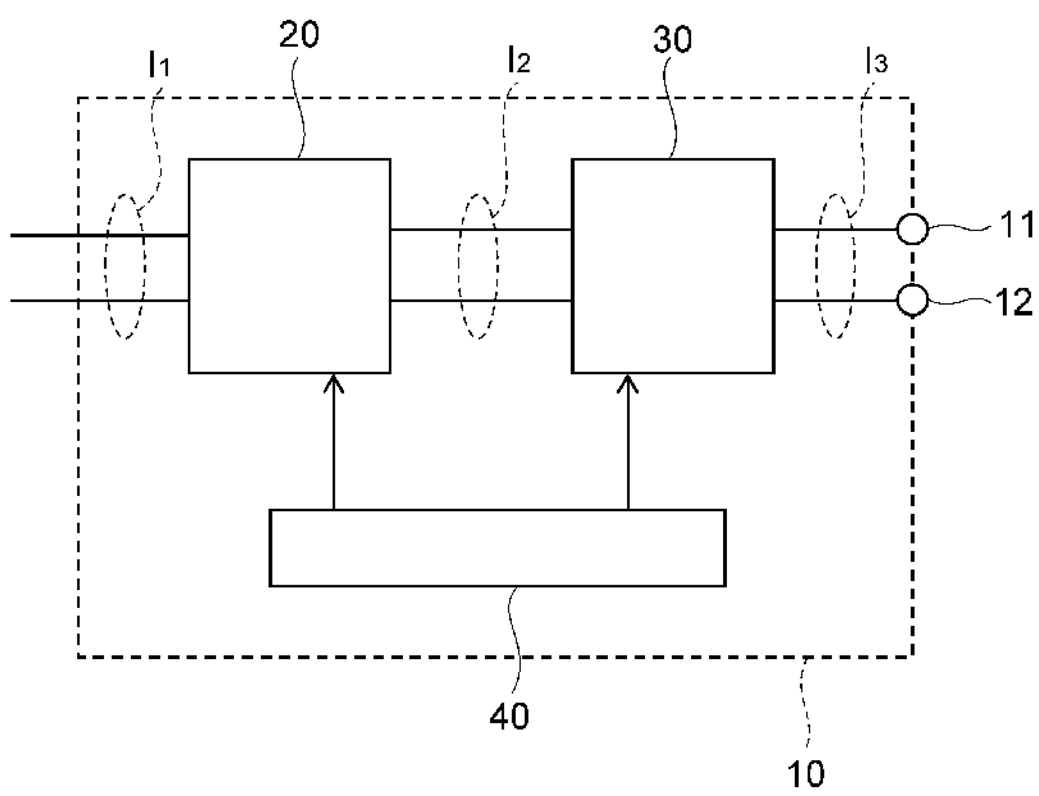
FIG. 3 is a block diagram showing a power supply of a dual-frequency power-supply apparatus according to the embodiment.

FIG. 3 is a block diagram showing the power supply of the dual-frequency power-supply apparatus according to the present embodiment.

As shown in FIG. 3, the power supply 10 of the dual-frequency power-supply apparatus 1 is provided with a converter 20 that converts an alternating current $I_1$ input from the outside into a direct current $I_2$, an inverter 30 that converts the direct current $I_2$ output from the converter 20 into an alternating current $I_3$ with an arbitrary frequency, and a controller 40 that controls the converter 20 and the inverter 30. Further, the power supply 10 is provided with a pair of output terminals 11, 12 that is connected to the inverter 30. Note that in the present specification, the "direct current" includes not only a narrowly-interpreted direct current with a constant current value, but also a pulsating current. The inverter 30 converts the direct current $I_2$ received from the converter 20 into the above-described low-frequency current and the above-described high-frequency current to output these currents.

Figure 4:
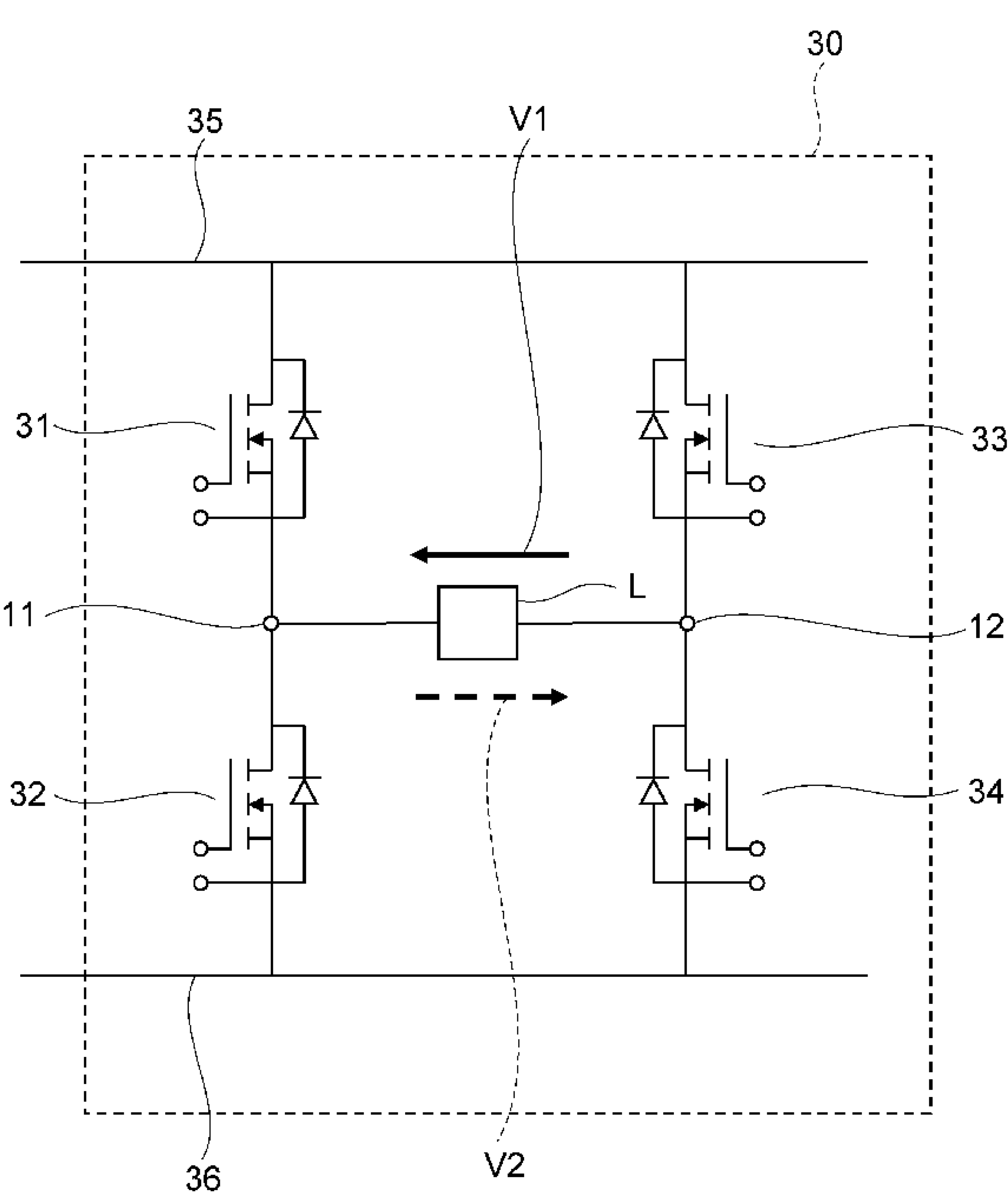
FIG. 4 is a circuit diagram showing an inverter of the power supply.

FIG. 4 is a circuit diagram showing the inverter of the power supply.

As shown in FIG. 4, the inverter 30 is provided with switching elements 31 to 34. The switching elements 31 to 34 are, for example, insulated gate bipolar transistors (IGBTs). Note that the switching elements 31 to 34 may be metal-oxide-semiconductor field-effect transistors (MOSFETs). Each of the switching elements 31 to 34 is provided with a switching portion and a diode portion, and these portions are connected in series. The switching portion includes a gate, and is switchable between a conduction state and a non-conduction state according to a potential applied to the gate.

Further, the inverter 30 is provided with a high-potential line 35 and a low-potential line 36. The high-potential line 35 is supplied with a high-potential-side potential from the converter 20, and the low-potential line 36 is supplied with a low-potential-side potential from the converter 20.

The switching element 31 is connected to between the high-potential line 35 (high-potential-side potential) and the output terminal 11 of the power supply 10. The switching element 32 is connected to between the low-potential line 36 (low-potential-side potential) and the output terminal 11. The switching element 33 is connected to between the high-potential line 35 and the output terminal 12 of the power supply 10. The switching element 34 is connected to between the low-potential line 36 and the output terminal 12.

Each gate of the switching elements 31 to 34 is connected to the controller 40. The controller 40 applies a desired potential to each gate of the switching elements 31 to 34, thereby independently switching each switching portion of the switching elements 31 to 34 between the conduction state and the non-conduction state. In FIG. 4, a load L is connected to between the output terminal 11 and the output terminal 12. The load L includes the first matching box 60, the second matching box 70, the transformer 80, and the coil 90 described above.

Note that a plurality of bridge circuits including the switching elements 31 to 34 may be connected in parallel between the high-potential line 35 and the low-potential line 36. With this configuration, the current to be supplied to the coil 90 can be increased.

Figure 5A:
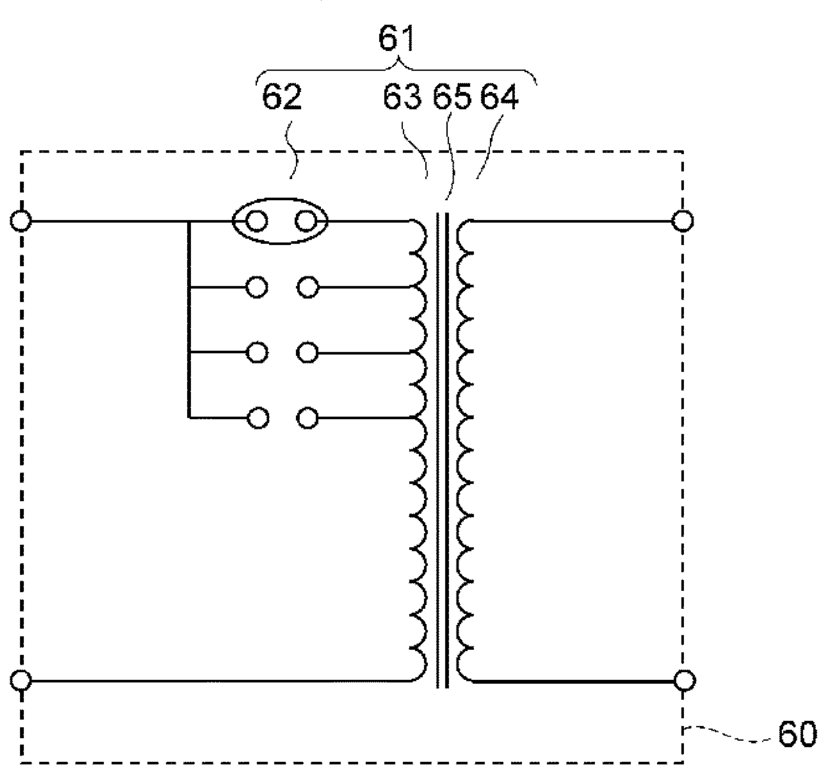
FIG. 5A is a circuit diagram showing a first matching box.
Figure 5B:
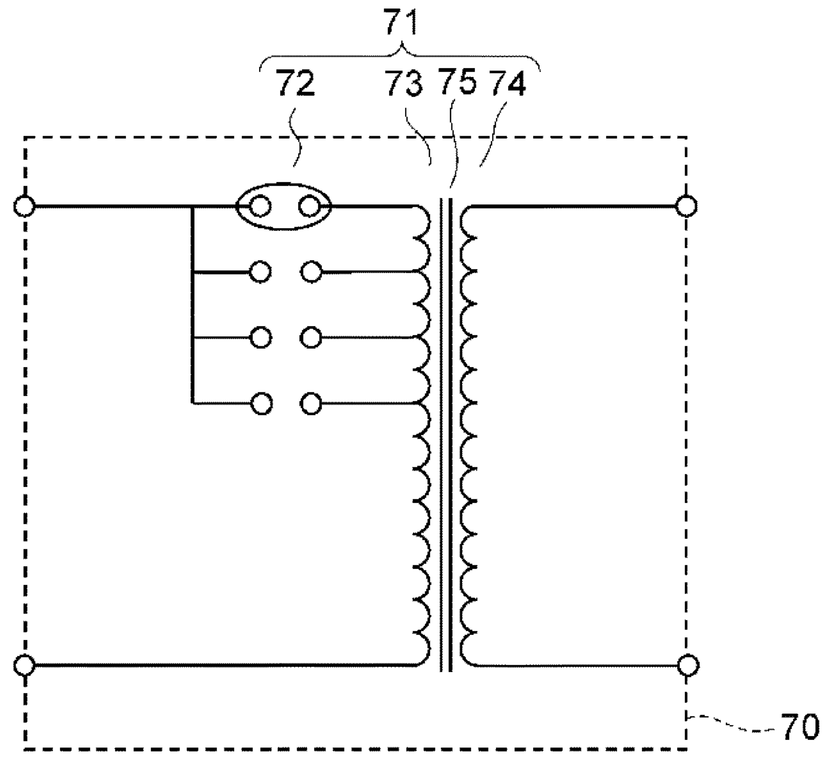
FIG. 5B is a circuit diagram showing a second matching box.

FIG. 5A is a circuit diagram showing the first matching box, and FIG. 5B is a circuit diagram showing the second matching box.

As shown in FIG. 5A, the first matching box 60 is provided with a matching transformer 61. The matching transformer 61 is provided with a switch 62, a primary coil 63, a secondary coil 64, and an iron core 65. The primary coil 63 is connected to the power supply 10, and the secondary coil 64 is connected to the transformer 80. Using the switch 62, the length of a portion, where the current flows, of the primary coil 63 is selected, and accordingly, the impedance of the primary coil 63 is controlled. The primary coil 63 and the secondary coil 64 are wound around the iron core 65, and are magnetically coupled to each other.

Similarly, as shown in FIG. 5B, the second matching box 70 is provided with a matching transformer 71. The matching transformer 71 is provided with a switch 72, a primary coil 73, a secondary coil 74, and an iron core 75. The primary coil 73 is connected to the power supply 10, and the secondary coil 74 is connected to the transformer 80. Using the switch 72, the length of a portion, where the current flows, of the primary coil 73 is selected, and accordingly, the impedance of the primary coil 73 is controlled. The primary coil 73 and the secondary coil 74 are wound around the iron core 75, and are magnetically coupled to each other.

Next, operation of the high-frequency quenching apparatus according to the present embodiment will be described.

Figure 6:
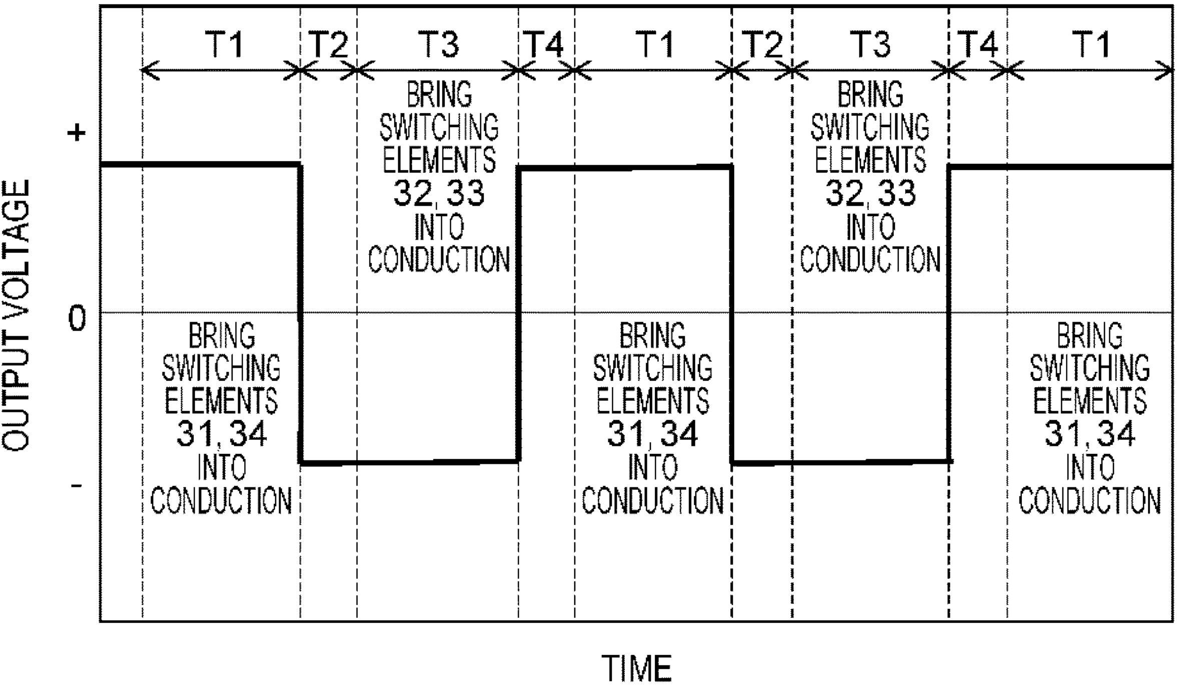
FIG. 6 is a timing chart showing operation of the inverter in the embodiment, the horizontal axis representing a time and the vertical axis representing the output voltage of the power supply.

FIG. 6 is a timing chart showing operation of the inverter in the present embodiment, the horizontal axis representing a time and the vertical axis representing the output voltage of the power supply.

Figure 7:
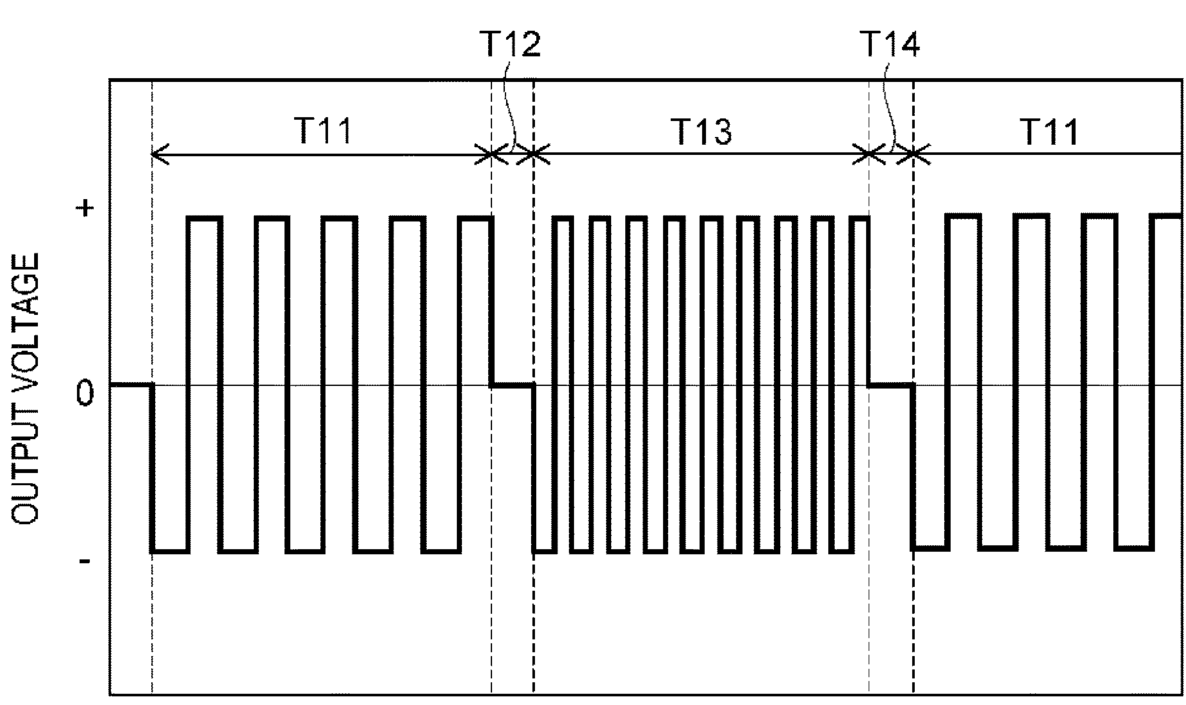
FIG. 7 is a timing chart showing operation of the power supply in the embodiment, the horizontal axis representing a time and the vertical axis representing the output voltage of the power supply.

FIG. 7 is a timing chart schematically showing operation of the power supply in the present embodiment, the horizontal axis representing a time and the vertical axis representing the output voltage of the power supply.

The output voltage represented by the vertical axis in FIGS. 6 and 7 is the potential of the output terminal 11 with respect to that of the output terminal 12.

Note that in order to simultaneously visualize a current waveform and frequency switching timing, the horizontal axis in FIG. 7 is not drawn to scale. Actually, the lengths of a first output period T11 in which the low-frequency current is output, a first intermission T12, a second output period T13 in which the high-frequency current is output, and a second intermission T14 are much longer than a current period. The same also applies to FIGS. 8 to 11 described later. Note that the output voltage of the power supply 10 is a square wave and the output current of the power supply 10 is a sine wave.

As shown in FIG. 3, the converter 20 of the power supply 10 receives, for example, a commercial alternating current such as a three-phase current of 440 V as the alternating current $I_1$. The converter 20 smooths the alternating current $I_1$ to generate the direct current $I_2$, and outputs the direct current $I_2$ to the inverter 30. The maximum voltage of the direct current $I_2$ is 550 V, for example.

As shown in FIGS. 4 and 6, the controller 40 of the power supply 10 repeats a first conduction period T1, a first non-conduction period T2, a second conduction period T3, and a second non-conduction period T4 in this order.

In the first conduction period T1, the controller 40 brings the switching element 31 and the switching element 34 into conduction, and does not bring the switching element 32 and the switching element 33 into conduction. Accordingly, a forward voltage indicated by a solid arrow V1 in FIG. 4 is applied to the load L.

In the first non-conduction period T2, the controller 40 does not bring all the switching elements 31, 32, 33, 34 into conduction. At this point, the output current flows in the diode portions of the switching elements 32, 33, and therefore, a reverse voltage indicated by a dashed arrow V2 is applied to the load L.

In the second conduction period T3, the controller 40 brings the switching element 32 and the switching element 33 into conduction, and does not bring the switching element 31 and the switching element 34 into conduction. Accordingly, the reverse voltage indicated by the dashed arrow V2 in FIG. 4 is applied to the load L.

In the second non-conduction period T4, the controller 40 does not bring all the switching elements 31, 32, 33, 34 into conduction. At this point, the output current flows in the diode portions of the switching elements 31, 34, and therefore, the forward voltage indicated by the solid arrow V1 is applied to the load L.

In this manner, the inverter 30 outputs the alternating current $I_3$ as shown in FIG. 3. The controller 40 switches the period of the cycle including the first conduction period T1, the first non-conduction period T2, the second conduction period T3, and the second non-conduction period T4, and accordingly, the power supply 10 alternately outputs the low-frequency current and the high-frequency current as shown in FIG. 7. The length of the first output period T11 in which the low-frequency current is output and the length of the second output period T13 in which the high-frequency current is output can be arbitrarily controlled. For example, a ratio between the length of the first output period T11 and the length of the second output period T13 may be 1:1. In this case, each of the length of the first output period T11 and the length of the second output period T13 may be 50 milliseconds (ms).

As shown in FIG. 2, the first frequency is selected by the resonance circuit including the matching capacitor 69 and the inductance of the first matching box 60 for the low frequency, and accordingly, the low-frequency current output from the power supply 10 passes through the first matching box 60. Similarly, the second frequency is selected by the resonance circuit including the matching capacitor 79 and the inductance of the second matching box 70 for the high frequency, and accordingly, the high-frequency current output from the power supply 10 passes through the second matching box 70. The low-frequency current output from the first matching box 60 and the high-frequency current output from the second matching box 70 are input to the transformer 80. The transformer 80 converts the received current and the voltage thereof to output the converted current to the coil 90.

In this manner, the coil 90 performs induction heating on the workpiece 200. Since the coil 90 is supplied with the low-frequency current and the high-frequency current, the quenching target portion can be uniformly heated even if the workpiece 200 is in the complicated shape. For example, in a case where the workpiece 200 is a gear, the gear root of the workpiece 200 is heated with the low-frequency current, and the gear tip of the workpiece 200 is heated with the high-frequency current.

As shown in FIG. 1, the high-frequency heating apparatus 101 heats the quenching target portion of the workpiece 200 to the temperature higher than the austenite transformation point, and thereafter, the cooling apparatus 102 rapidly cools the workpiece 200. In this manner, the quenching target portion of the workpiece 200 is quenched.

Next, a method for switching the first output period T11, the first intermission T12, the second output period T13, and the second intermission T14 by the power supply 10 will be described in more detail.

Figure 8:
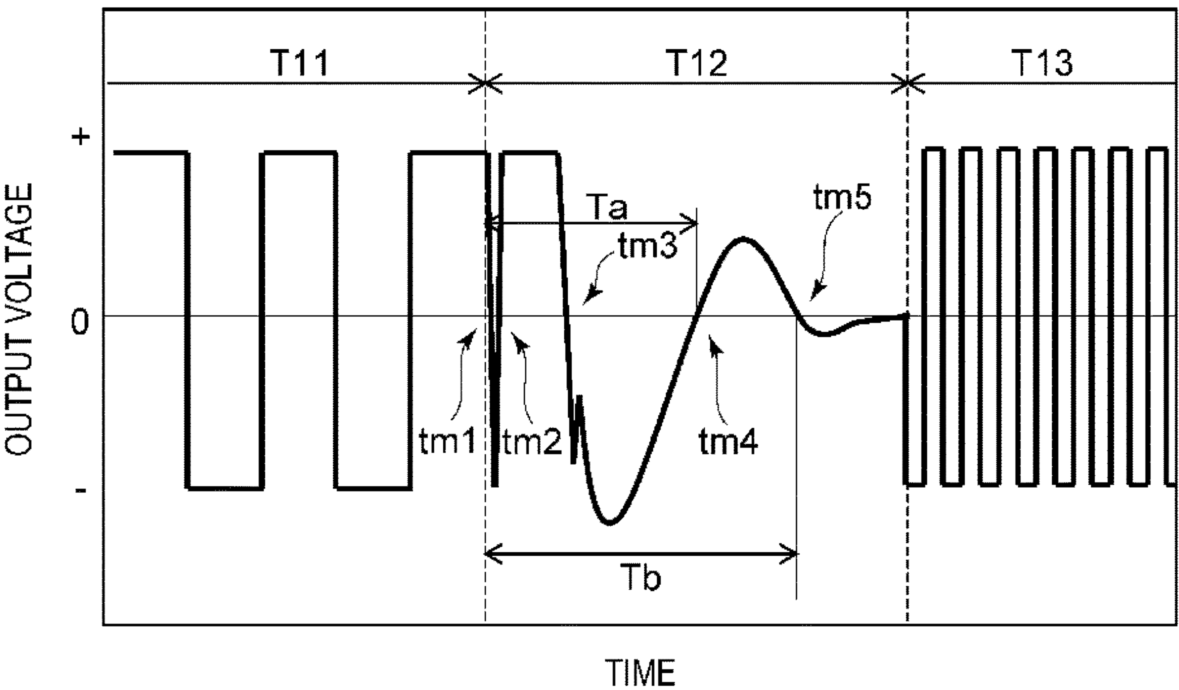
FIG. 8 is a timing chart showing operation upon transition from a first output period to a second output period through a first intermission in the embodiment, the horizontal axis representing a time and the vertical axis representing the output voltage of the power supply.

FIG. 8 is a timing chart showing operation upon transition from the first output period T11 to the second output period T13 through the first intermission T12 in the present embodiment, the horizontal axis representing a time and the vertical axis representing the output voltage of the power supply.

Figure 9:
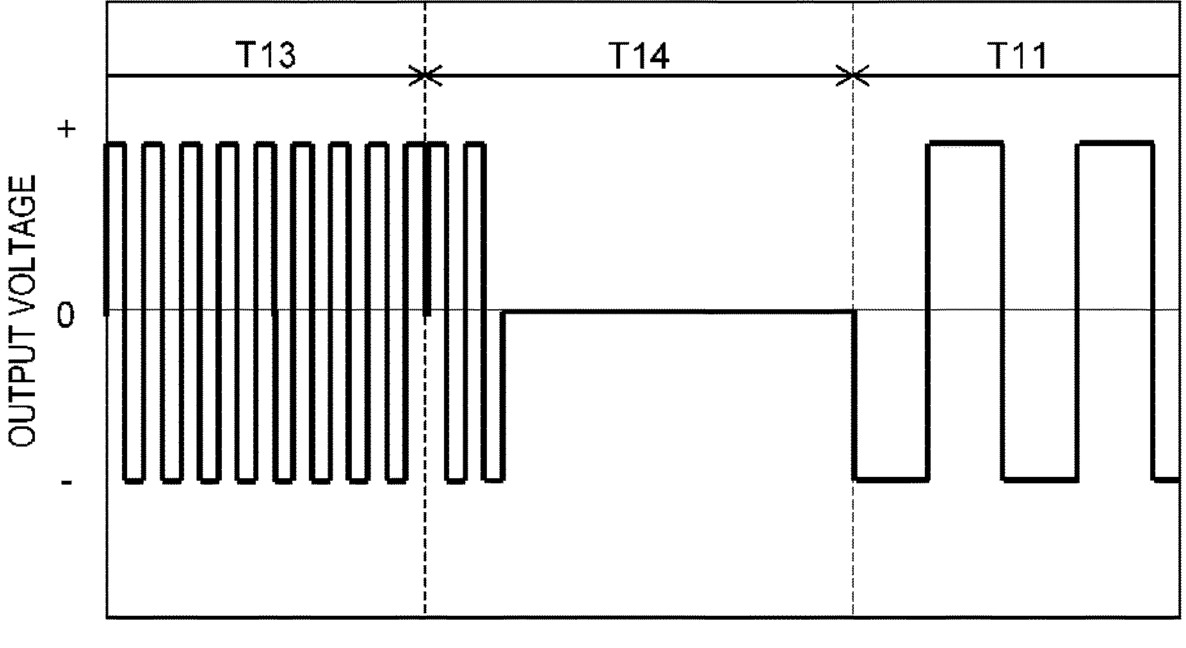
FIG. 9 is a timing chart showing operation upon transition from the second output period to the first output period through a second intermission in the embodiment, the horizontal axis representing a time and the vertical axis representing the output voltage of the power supply.

FIG. 9 is a timing chart showing operation upon transition from the second output period T13 to the first output period T11 through the second intermission T14 in the present embodiment, the horizontal axis representing a time and the vertical axis representing the output voltage of the power supply.

As shown in FIG. 8, the controller 40 of the power supply 10 executes the first output period T11. Accordingly, the power supply 10 outputs the low-frequency current. Next, the controller 40 ends the first output period T11. The end of the first output period T11 is the first conduction period T1 (see FIG. 6). In the first conduction period T1, the forward voltage indicated by the solid arrow V1 in FIG. 4 is applied to the load L.

Next, the controller 40 starts the first intermission T12. That is, all the switching elements 31, 32, 33, 34 are in the non-conduction state. At this point, the phase of the current is slightly delayed with respect to switching of the switching elements, and therefore, the current tends to flow, immediately after transition to the first intermission T12, in the load L in the same direction as that in the first conduction period T1. Accordingly, the current flows in the diode portions of the switching elements 32, 33, and the voltage is reversed for a moment. Thus, the polarity of the output voltage of the inverter 30 is reversed firstly at timing tm1 immediately after the start of the first intermission T12, and the reverse voltage indicated by the arrow V2 in FIG. 4 is applied to the load L.

Thereafter, an oscillating current due to the resonance is reversed, and the current flows in the diode portions of the switching element 31 and the switching element 34. Accordingly, the polarity of the output voltage of the inverter 30 is reversed secondly at timing tm2, and the forward voltage indicated by the arrow V1 is applied to the load L.

Immediately after transition to the first intermission T12, the resonance lasts, and therefore, the oscillating current oscillates with a frequency at a level similar to that of a low resonance frequency. Due to current oscillation, the current direction is reversed, and accordingly, the current flows in the diode portions of the switching elements 32, 33. Accordingly, the polarity of the output voltage is reversed thirdly at timing tm3.

Since the low-frequency current output in the first output period T11 has a low frequency, oscillation due to the resonance is less likely to last after transition to the first intermission T12, and a next polarity reversion tends to be longer than the resonance frequency. Since current oscillation lasts, the current direction is reversed again, and accordingly, the current flows in the diode portions of the switching elements 31, 34. Accordingly, the polarity of the output voltage is reversed fourthly at timing tm4. The reverse voltage is applied to the load L between the timing tm3 and the timing tm4.

Subsequently, the current flowing in the load L attenuates while oscillating. Accordingly, the voltage applied to the load L, i.e., the output voltage of the power supply 10, also attenuates while oscillating. At timing tm5 after the timing tm4, the polarity of the output voltage of the power supply 10 is reversed fifthly. The forward voltage is applied to the load L between the timing tm4 and the timing tm5.

In the present embodiment, the controller 40 sets the length of the first intermission T12 longer than a time Ta until the timing tm4 at which the polarity of the output voltage of the power supply 10 is reversed fourthly after transition from the first output period T11 to the first intermission T12. More preferably, the controller 40 sets the length of the first intermission T12 longer than a time Tb until the timing tm5 at which the polarity of the output voltage of the power supply 10 is reversed fifthly after transition from the first output period T11 to the first intermission T12. That is, T12>Ta is satisfied, and more preferably T12>Tb is satisfied.

Next, the controller 40 executes the second output period T13 after the end of the first intermission T12. Accordingly, the high-frequency current is output from the power supply 10.

Next, as shown in FIG. 9, the controller 40 ends the second output period T13, and starts the second intermission T14. That is, the controller 40 brings all the switching elements 31, 32, 33, 34 into the non-conduction state. As in the first intermission T12, the length of the second intermission T14 is set longer than a time until the timing at which the polarity of the output voltage of the power supply 10 is reversed fourthly after transition from the second output period T13 to the second intermission T14. That is, T14>Ta is satisfied. More preferably, the controller 40 sets the length of the second intermission T14 longer than a time until the timing at which the polarity of the output voltage of the power supply 10 is reversed fifthly after transition from the second output period T13 to the second intermission T14. That is, T14>Tb is satisfied. Note that the frequency of the high-frequency current output in the second output period T13 is higher than that in the first intermission T12, and therefore, the frequency of the oscillating current is also high and the above-described conditions are easily satisfied. The controller 40 ends the second intermission T14, and thereafter, starts the first output period T11 again. The start of the first output period T11 is the second conduction period T3 (see FIG. 6). In the second conduction period T3, the reverse voltage is applied to the load L. Note that the present invention is not limited thereto and the start of the first output period T11 may be the first conduction period T1.

According to the present embodiment, the length of the first intermission T12 is set longer than the time Ta until the timing tm4 at which the polarity of the output voltage of the power supply 10 is reversed fourthly after transition from the first output period T11 to the first intermission T12, and therefore, occurrence of a surge current can be reduced when the first output period T11 is started again. Consequently, damage of the switching elements 31 to 34 due to the surge current can be reduced. As a result, the dual-frequency power-supply apparatus 1 according to the present embodiment has a high durability.

Moreover, the length of the first intermission T12 is set longer than the time Tb until the timing tm5 at which the polarity of the output voltage of the power supply 10 is reversed fifthly after transition from the first output period T11 to the first intermission T12, and therefore, occurrence of the surge current subsequently in the first output period T11 can be more effectively reduced. As a result, the durability of the dual-frequency power-supply apparatus 1 can be further improved.

Similarly, the length of the second intermission T14 is set longer than the time until the timing at which the polarity of the output voltage of the power supply 10 is reversed fourthly after transition from the second output period T13 to the second intermission T14, and therefore, occurrence of the surge current can be reduced when the second output period T13 is started again. Consequently, damage of the switching elements 31 to 34 due to the surge current can be reduced.

Moreover, the length of the second intermission T14 is set longer than the time until the timing at which the polarity of the output voltage of the power supply 10 is reversed fifthly after transition from the second output period T13 to the second intermission T14, and therefore, occurrence of the surge current subsequently in the second output period T13 can be more effectively reduced.

Comparative Example

Next, a comparative example will be described.

Figure 10:
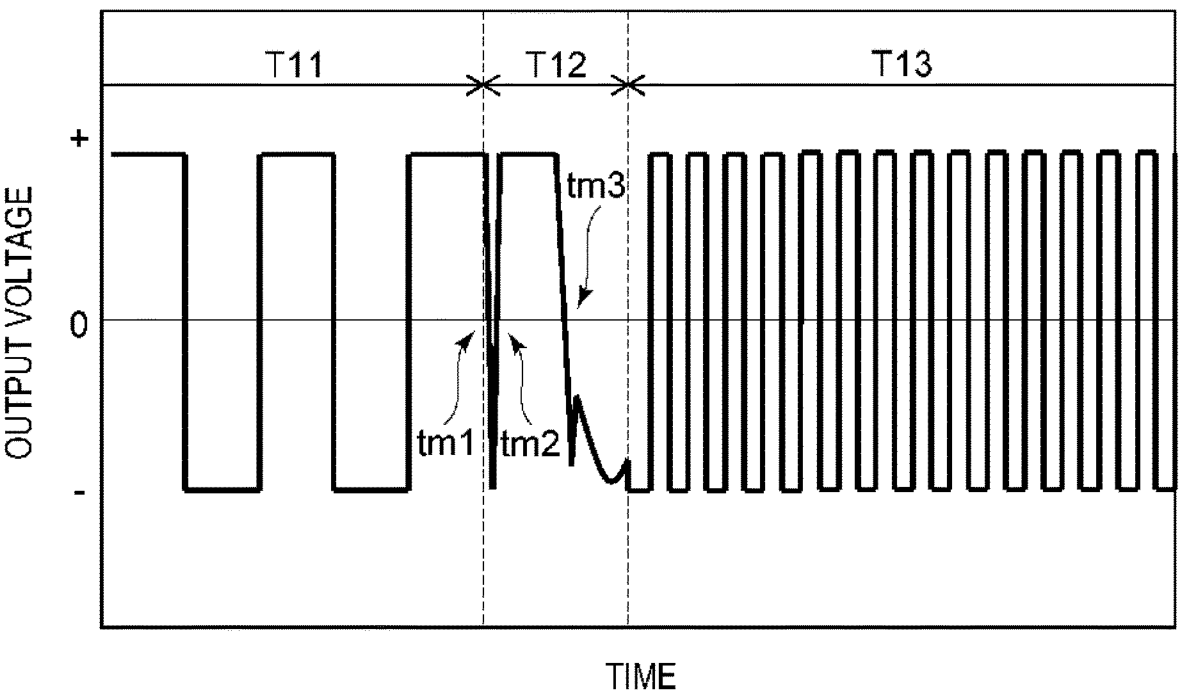
FIG. 10 is a timing chart showing operation upon transition from the first output period to the second output period through the first intermission in a comparative example, the horizontal axis representing a time and the vertical axis representing the output voltage of the power supply.

FIG. 10 is a timing chart showing operation upon transition from the first output period T11 to the second output period T13 through the first intermission T12 in the present comparative example, the horizontal axis representing a time and the vertical axis representing the output voltage of the power supply.

Figure 11:
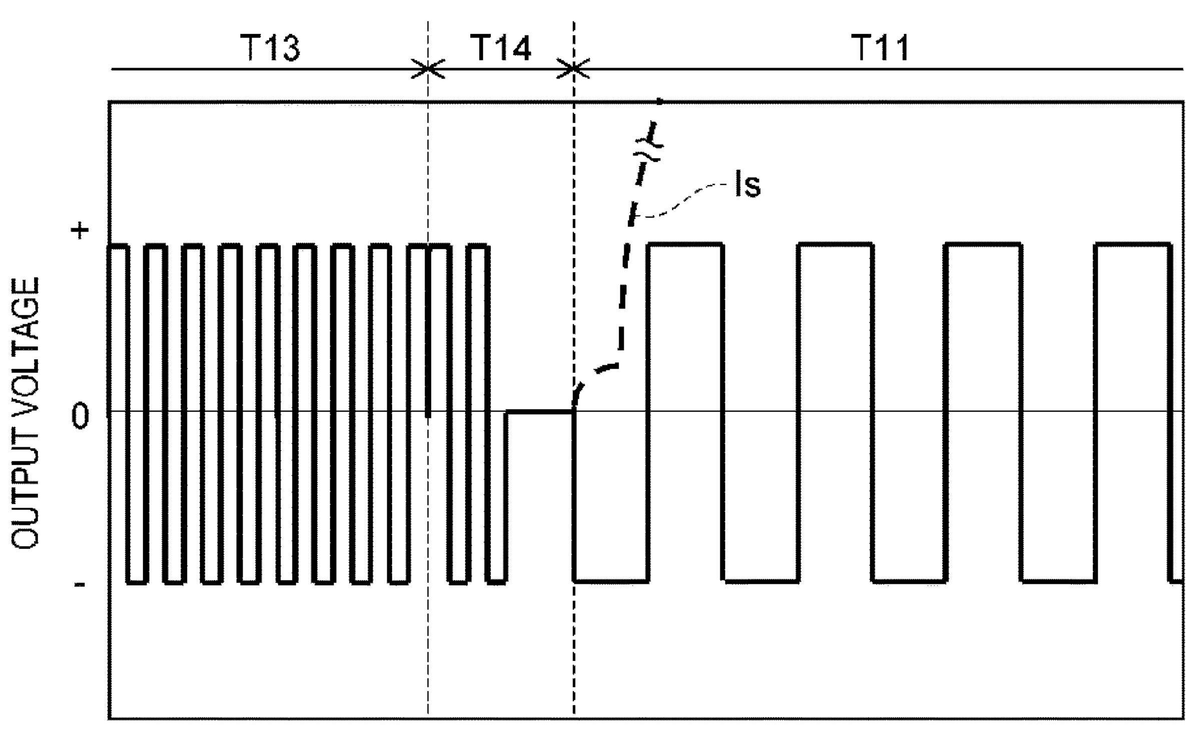
FIG. 11 is a timing chart showing operation upon transition from the second output period to the first output period through the second intermission in the comparative example, the horizontal axis representing a time and the vertical axis representing the output voltage of the power supply.

FIG. 11 is a timing chart showing operation upon transition from the second output period T13 to the first output period T11 through the second intermission T14 in the present comparative example, the horizontal axis representing a time and the vertical axis representing the output voltage of the power supply.

Note that in FIG. 11, the surge current flowing in the inverter 30 of the power supply 10 is also indicated by a dashed line.

As shown in FIG. 10, in the present comparative example, the length of the first intermission T12 is set shorter than the time Ta (see FIG. 8) until the fourth reversion after transition from the first output period T11 to the first intermission T12. That is, the second output period T13 is started before the timing tm4 (see FIG. 8) of the fourth reversion and after the start of the first intermission T12 and the timing tm3 at which the polarity of the output voltage of the inverter 30 is reversed thirdly.

In this case, as shown in FIG. 11, the surge current Is indicated by the dashed line in FIG. 11 flows in the inverter 30 of the power supply 10 when the first output period T11 is started from the second conduction period T3 (see FIG. 6) after the second intermission T14. For this reason, there is a probability that the switching elements 31 to 34 forming the inverter 30 are damaged.

Hereinafter, a mechanism of generating the surge current in the present comparative example will be described.

Note that the mechanism described below is not confirmed, but is estimated.

As shown in FIGS. 6 and 10, in the first output period T11 in which the low-frequency current is output, the time of each of the first conduction period T1 and the second conduction period T3 is longer than that in the second output period T13. For this reason, every time the first conduction period T1 and the second conduction period T3 are executed, the iron core 65 of the matching transformer 61 of the first matching box 60 and the iron core 75 of the matching transformer 71 of the second matching box 70 are bias-magnetized, and accordingly, are brought into a state close to magnetic saturation. Since the iron core 75 of the matching transformer 71 for the high frequency is smaller in a cross-sectional area than the iron core 65 of the matching transformer 61 for the low frequency, the iron core 75 is more easily magnetically saturated. In a case where the first conduction period T1 is executed at the end of the first output period T11, the first output period T11 ends with the iron core 65 bias-magnetized in the forward direction.

Moreover, in the present comparative example, the first intermission T12 is short, and transitions to the second output period T13 before bias magnetization is sufficiently eliminated. In the second output period T13, the first conduction period T1 and the second conduction period T3 are alternately switched with the same times, and for both polarities, the same voltages are applied for the same times. For this reason, bias magnetization of the matching transformer is not eliminated much. In the second intermission T14 subsequent to the second output period T13, the biased voltage is applied to the matching transformers 61, 71. However, since the frequency in the second output period T13 is high, a time for which the biased voltage is applied is short. Since the second intermission T14 is sufficiently longer than the voltage application period in which the oscillating current is applied immediately after the start of the second intermission T14, the degree of bias magnetization in the second intermission T14 is low. Note that bias magnetization caused in the first intermission T12 is not eliminated.

As shown in FIG. 11, when the first output period T11 is started from the second conduction period T3, the reverse voltage is further applied to the iron cores 65, 75 for which bias magnetization in the reverse direction is not eliminated, and the iron core 65 or the iron core 75 is magnetically saturated. For this reason, the matching transformer 61 or the matching transformer 71 is in the same state as that in a case where no iron core is provided, and is electrically in a state in which only a primary winding is provided. Accordingly, the impedance rapidly decreases, and the output current of the power supply rapidly increases. Thus, a high surge voltage is generated in the switching elements 31 to 34 forming the inverter 30, and a great surge current Is flows. As a result, the switching elements 31 to 34 forming the inverter 30 are damaged.

In the first intermission T12, the oscillating current due to the resonance flows in each diode portion of the switching elements 32, 33, and accordingly, the reverse voltage is applied to the load L. As the oscillating current is weakened, the oscillation period becomes longer. Thus, the period between the timing tm3 and the timing tm4 is longer than the period between the timing tm2 and the timing tm3. As described above, the reverse voltage is applied to the load L in the period between the timing tm3 and the timing tm4, and therefore, the iron cores 65, 75 are bias-magnetized in the reverse direction. In the present embodiment, the first intermission T12 is longer than the time Ta as shown in FIG. 8. Thus, the end of the first intermission T12 is after the timing tm4, and therefore, the forward voltage is applied, due to the oscillating current, to the load L after the timing tm4 and bias magnetization in the reverse direction is eliminated. Consequently, even if the next first output period T11 is started from the second conduction period T3 as shown in FIG. 9, the iron core 65 is not magnetically saturated, and no surge current Is flows.

Note that the upper limit of the first intermission T12 is not specifically set in order to reduce the surge current, but as the first intermission T12 becomes longer, the time for which no current is supplied to the coil 90 increases. Thus, a heating efficiency is degraded. For this reason, the first intermission T12 is preferably short in order to ensure the heating efficiency.

Experiment Example

Next, an experiment example of the present embodiment will be described.

In the present experiment example, the dual-frequency power-supply apparatus 1 according to the above-described embodiment was actually produced, and was operated with different frequencies of the low-frequency current. Then, the output voltage of the power supply 10 was monitored, and the time Ta until the polarity of the output voltage of the power supply 10 is reversed fourthly after transition from the first output period T11 to the first intermission T12 was measured.

Figure 12:
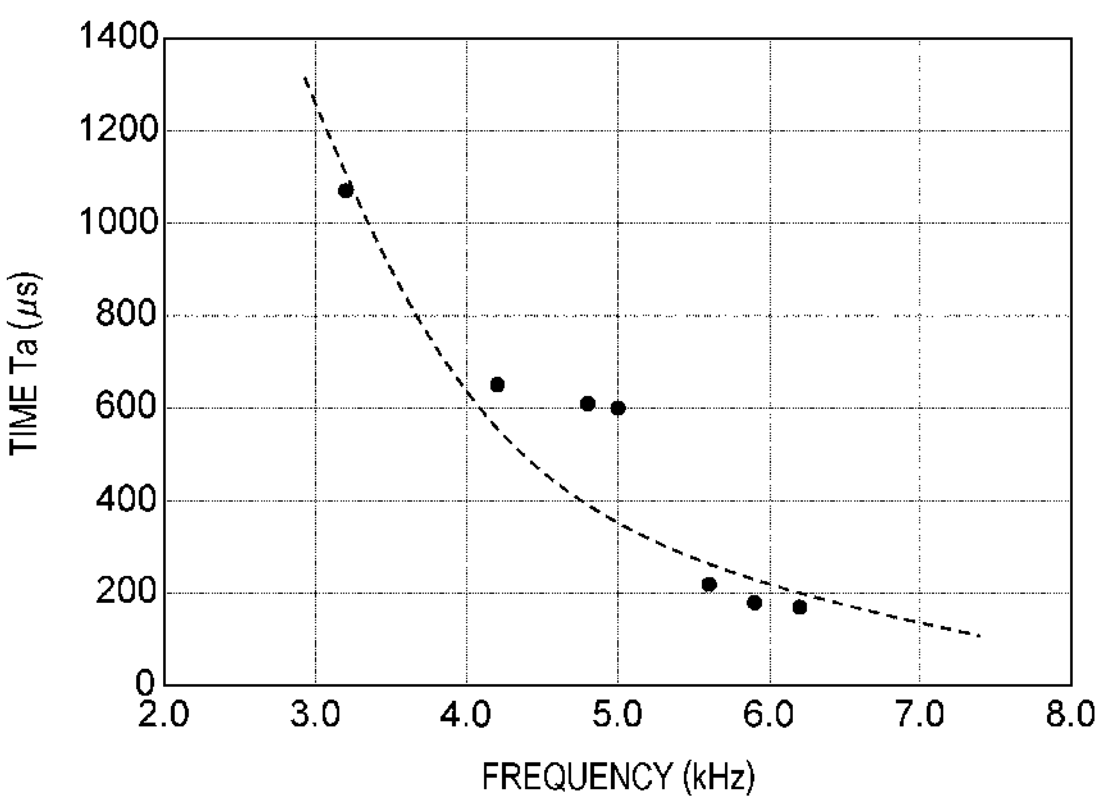
FIG. 12 is a graph showing a relationship between the frequency of a low-frequency current and a time Ta in the present experiment example, the horizontal axis representing the frequency of the low-frequency current and the vertical axis representing the time Ta until the polarity of the output voltage of the power supply is reversed fourthly.

FIG. 12 is a graph showing a relationship between the frequency of the low-frequency current and the time Ta in the present experiment example, the horizontal axis representing the frequency of the low-frequency current and the vertical axis representing the time Ta until the polarity of the output voltage of the power supply 10 is reversed fourthly.

As shown in FIG. 12, the time Ta increases as the frequency of the low-frequency current decreases. This is assumed because of the following reasons. As the frequency decreases, the first conduction period T1 and the second conduction period T3 become longer, and therefore, the frequency of the output current due to the resonance frequency decreases. Accordingly, the period in which the current oscillates becomes longer, and therefore, the current oscillation period is longer in a state in which current oscillation lasting after transition to the first intermission T12 is weakened. Accordingly, it is estimated that the time Ta until the fourth reversion increases. On the other hand, as the first conduction period T1 or the second conduction period T3 becomes longer, bias magnetization of the iron cores 65, 75 becomes greater, and the reverse voltage application time required for eliminating bias magnetization increases. Thus, the first intermission T12 is set longer than the time Ta so that bias magnetization can be stably eliminated and magnetic saturation of the iron cores 65, 75 can be reduced regardless of the frequency of the low-frequency current and the surge current due to magnetic saturation can be reduced.

The above-described embodiment is an embodied example of the present invention, and the present invention is not limited to this embodiment. For example, the present invention also includes those obtained by addition of some components to the above-described embodiment, omission of some components from the above-described embodiment, and change in some components in the above-described embodiment.

REFERENCE SIGNS LIST

1: Dual-frequency power-supply apparatus
10: Power supply
11, 12: Output terminal
20: Converter
30: Inverter
31, 32, 33, 34: Switching element
35: High-potential line
36: Low-potential line
40: Controller
60: First matching box
61: Matching transformer
62: Switch
63: Primary coil
64: Secondary coil
65: Iron core
69: Matching capacitor
70: Second matching box
71: Matching transformer
72: Switch
73: Primary coil
74: Secondary coil
75: Iron core
79: Matching capacitor
80: Transformer
90: Coil
100: High-frequency quenching apparatus
101: High-frequency heating apparatus
102: Cooling apparatus
200: Workpiece
$I_1$: Alternating current
$I_2$: Direct current
$I_3$: Alternating current
$I_S$: Surge current
L: Load
T1: First conduction period
T2: First non-conduction period
T3: Second conduction period
T4: Second non-conduction period
T11: First output period
T12: First intermission
T13: Second output period
T14: Second intermission
Ta: Time until polarity of output voltage of power supply is reversed fourthly after transition from first output period to first intermission
Tb: Time until polarity of output voltage of power supply is reversed fifthly after transition from first output period to first intermission
tm1, tm2, tm3, tm4, tm5: Timing

What is claimed is:

1. A dual-frequency power-supply apparatus comprising:
a power supply that alternately outputs a first alternating current with a first frequency and a second alternating current with a second frequency higher than the first frequency;
a first matching box that has a first matching transformer and is capable of receiving an output current of the power supply to output the first alternating current; and
a second matching box that has a second matching transformer and is capable of receiving the output current of the power supply to output the second alternating current,
wherein the power supply has
an inverter that converts a direct current into the first alternating current and the second alternating current, and
a controller that controls the inverter,
the controller repeats, in this order,
a first output period in which the first alternating current is output,
a first intermission in which output is stopped,
a second output period in which the second alternating current is output, and
a second intermission in which output is stopped, and
a length of the first intermission is set longer than a time until a polarity of an output voltage of the power supply is reversed fourthly after transition from the first output period to the first intermission.

2. The dual-frequency power-supply apparatus according to claim 1, wherein
the controller sets the length of the first intermission longer than a time until the polarity of the output voltage of the power supply is reversed fifthly after transition from the first output period to the first intermission.

3. The dual-frequency power-supply apparatus according to claim 2, wherein
the controller sets a length of the second intermission longer than a time until the polarity of the output voltage of the power supply is reversed fourthly after transition from the second output period to the second intermission.

4. The dual-frequency power-supply apparatus according to claim 1, wherein
the controller sets a length of the second intermission longer than a time until the polarity of the output voltage of the power supply is reversed fourthly after transition from the second output period to the second intermission.

5. The dual-frequency power-supply apparatus according to claim 4, wherein
the controller sets the length of the second intermission longer than a time until the polarity of the output voltage of the power supply is reversed fifthly after transition from the second output period to the second intermission.

6. The dual-frequency power-supply apparatus according to claim 1, wherein the power supply further has a converter that converts an alternating current into the direct current to output a high-potential-side potential and a low-potential-side potential, and the inverter has a first switching element that is connected to between the high-potential-side potential and a first output terminal of the power supply, a second switching element that is connected to between the low-potential-side potential and the first output terminal, a third switching element that is connected to between the high-potential-side potential and a second output terminal of the power supply, and a fourth switching element that is connected to between the low-potential-side potential and the second output terminal.

7. A high-frequency heating apparatus comprising:

the dual-frequency power-supply apparatus according to claim 1; and a coil that receives the first alternating current and the second alternating current from the dual-frequency power-supply apparatus.

8. A high-frequency quenching apparatus comprising:

the high-frequency heating apparatus according to claim 7; and a cooling apparatus that cools a workpiece heated by the high-frequency heating apparatus.

* * * * *